United States Patent [19]

Wozniak et al.

[11] Patent Number: 4,861,205

[45] Date of Patent: Aug. 29, 1989

[54] TIE-DOWN ASSEMBLY FOR SECURING A CASK CONTAINING RADIOACTIVE WASTE TO A VEHICLE

[75] Inventors: David J. Wozniak, Clementon, N.J.; Charles W. Mallory, Severna Park, Md.

[73] Assignee: Westinghouse Electric Corp., Pittsburgh, Pa.

[21] Appl. No.: 154,403

[22] Filed: Feb. 10, 1988

[51] Int. Cl.$^4$ ............................................. B60P 7/12
[52] U.S. Cl. ........................................ 410/47; 410/97
[58] Field of Search ....................... 410/47, 48, 49, 50, 410/53, 54, 55, 56, 57, 96, 97, 117, 120, 130, 150

[56] References Cited

U.S. PATENT DOCUMENTS

| | | | |
|---|---|---|---|
| 3,070,043 | 12/1962 | Decker | 410/47 |
| 3,154,026 | 10/1964 | Klasing | 410/97 |
| 3,720,398 | 3/1973 | Grise | 410/97 |
| 3,807,759 | 4/1974 | Vornberger | 410/50 |
| 4,487,537 | 12/1984 | Morse | 410/47 |

OTHER PUBLICATIONS

"Hittman Nuclear & Development Corp.", copyright 1982, Hittman Nuclear, Columbia, Md.

*Primary Examiner*—Sherman D. Basinger
*Assistant Examiner*—Stephen P. Avila

[57] ABSTRACT

An improved tie-down assembly for connecting a transportation cask containing radioactive wastes to the trailer of a tractor-trailer as disclosed herein. Each of the lugs is characterized by a flat profile and is formed from steel which is less ductile than the steel forming the walls of the cask, yet having an ultimate stress which is higher than the ultimate stress of the steel forming the cask walls. Additionally, each of the lugs includes a reinforcing plate having substantially the same shape as the contour of the cask walls, as well as an elongated, flat lug member that terminates in an eyelet for attaching the lug member to a tensioned cable. The lower ductility of the lugs, coupled with the extremely flat profile made possible by the higher ultimate stress of the material that forms them, minimizes the moment forces that the tensioned cables apply to the cask walls, and minimizes the chance that the lugs will apply a rupturing or breaking force onto the cask walls in the event of a severe accident. Each of the lug members is colinearly aligned with its respective tensioned cable, and each cable is attached to the support beams of the vehicle. The lugs are welded around the circumference of the cask at the same height at 50 degree angles with respect to the longitudinal center line of the trailer, and the cables are arranged in front and rear x-shaped configurations that intersect the longitudinal center line of the trailer at 40 degree angles. The "mechanical fuse" property of the lugs in combination with such cable geometry results in a safer and stronger tie-down assembly.

31 Claims, 3 Drawing Sheets

TIE-DOWN ASSEMBLY FOR SECURING A CASK CONTAINING RADIOACTIVE WASTE TO A VEHICLE

BACKGROUND OF THE INVENTION

This invention generally relates to tie-down assemblies, and is specifically concerned with a tie-down assembly for securing a cask for transporting radioactive waste to a semi-tractor trailer.

Casks for transporting radioactive materials such as the waste products produced by nuclear power plant facilities are known in the prior art. The purpose of such casks is to ship radioactive wastes in as safe a manner as possible. Such casks may be used, for example, to ship high-level vitrified waste cannisters to a permanent waste isolation site, spent fuel rods to a reprocessing facility, or low-level wastes such as spent ion exchange resins used to purify the water used in steam generators. At the present time, relatively few of such transportation casks have been manufactured and used since most of the wastes generated by nuclear power plants are being stored at the reactor facilities themselves. However, the availability of such on-site storage space is steadily diminishing as more and more waste is loaded therein. Additionally, the United States Department of Energy (DOE) has been obligated, by way of the National, Waste Policy Act of 1983, to move the radioactive wastes from the on-site storage facilities of all nuclear power plants to a federally operated nuclear waste disposal site starting in 1998. Thus the need for such casks may be expect to grow.

Tie-down arrangements for securing such casks to conventional road vehicles, such as tractor-trailers, are also known in the art. Such arrangements generally include a plurality of lug assemblies which are welded to the cask walls. These lug assemblies provide a convenient means of attaching the cask to an arrangement of tensioned cables which are in turn connected to the corners of the trailer deck. In order to comply with federal regulations, these tie-down arrangements must meet, two conflicting criteria specifically set forth in 10 C.F.R. Sections 71.45b(1) and 71.45b(3). The first criteria is that the cask lugs used in the tie-down arrangement must be capable of sustaining vertical, longitudinal and transverse static forces equivalent to two, ten and five times the weight of the cask and its contents, respectively. The second criteria requires each tie-down lug which is a structural part of the cask to be designed so that failure of the cask lug under excessive load or accident conditions would not break or rupture the cask walls and thereby breach containment. In short, the cask lugs must be strong enough to withstand the G forces set forth in the first criteria, yet weak enough to yield or break off of the cask before accident-induced stresses which the lugs apply to the cask walls would cause the walls to rupture.

While tie-down arrangements have been designed which do comply with the specifications set forth in 10 C.F.R. Sections 71.45b(1) and 71.45b(3), applicants have observed that there is considerable room for improvement in these prior art designs in at least three major respects. First, the overall factor of safety of such prior art tie-down arrangements is commonly about 1.01 or less. Hence, if the design of the tie-down arrangement is mis-executed, or the construction of the arrangement is any way defective, these tie-down arrangements would not comply with federal regulations, thus enhancing the possibility that a cask may become ruptured under accident conditions. Secondly, none of the tie-down arrangements of which applicants are aware seem to be specifically designed to withstand the 5-10-2G regulatory criteria. Instead, these designs seem to be directed (along the horizontal plane, at least) toward resisting forces equally along the longitudinal and transverse axis of the trailer. Consequently, most prior art tie-down arrangements anchor the cask to the outer edges of the trailer deck in an attempt to minimize the moment forces expected to be applied to the cas walls during an accident condition. However, such an anchoring configuration requires the outer edge of the trailer deck to be specially reinforced if the tie-down assembly is to have any chance of successfully resisting the high forces anticipated.

Clearly, what is needed is a tie-down assembly capable of meeting the aforementioned criteria by a substantially larger factor of safety, and which obviates the need for specially reinforcing the trailer upon which it is carried. Moreover, it would be desirable if such a tie-down assembly were designed to specifically resist the hypothetical 5-10-2G forces spelled out in the pertinent regulations. Such a tie-down assembly should further be compatible with existing cask designs, and easy to install therewith. Finally, the tie-down assembly should be easy to manufacture, and formed from relatively inexpensive and readily available materials.

SUMMARY OF THE INVENTION

Generally, the invention is an improved tie-down assembly for securing a cask to a trailer via tensioned cable that comprises cask lugs which will yield and break off or pull out before applying potentially rupturing stresses in the regions where these lugs are connected to the cask. The cask lugs comprise both a reinforcing plate and an elongated, plate-like lug member arranged in a flat configuration which are formed from a material whose ultimate stress is slightly higher than its yield stress, while the cask walls are formed from a material whose ultimate stress is substantially higher than its yield stress. Additionally, the ultimate stress of the material forming the cask lugs is higher than the ultimate stress of the material forming the cask walls. The lower ductility of the lug assembly causes to act as a mechanical fuse which tears off the cask walls before the walls are exposed to potentially rupturing stresses. The higher strength of the material forming the cask lugs allows their generally flat profile to be made as thin as possible, thereby minimizing the moment forces that the cask lugs apply to the cask walls. In the preferred embodiment, the reinforcing plate and lug member are formed from ASTM 572 grade 65 steel, while the cask wall is formed from ASTM 516 grade 55 steel.

The reinforcing plate preferably has substantially the same shape as the contour of the outer walls of the cask so as to be attached flush thereto. Moreover, the elongated lug member preferably includes a face which is connected substantially flush with the outer surface of the reinforcing plate so that the overall thickness of the resulting cask lug assembly is minimized. Such a configuration minimizes the bending moment forces applied to the outer cask walls by the tensioned cable attached to the lug assembly during an accident condition.

To further minimize the moment forces that the lugs apply to the cask walls, and to maximize the tensile strength of the tie-down assembly as a whole, each elongated plate-like lug member is aligned colinearly with its respective tensioned cable, and each cable is attached to one of the support beams of the vehicle. A front set and a rear set of lugs may be welded around the circumference of a vertically oriented, cylindrical cask at the same height at 50 degree angles with respect to the longitudinal center line of the trailer and cask. The center of the cask is preferably placed equidistant between the two parallel support beams of the vehicle, and the tensioned cables are arranged in front of and behind the cask in an overlapping x-shaped configuration, each of which intersects the longitudinal axis of the trailer at a 40 degree angle. To prevent the overlapping cables in each of the x-shaped configurations from mechanically interfering with one another, the lug members of each of the pairs of lugs are oriented 35 degrees and 38 degrees from the horizontal, respectively. Such a cable and lug orientation provides an anchoring configuration which attaches the cask to the strongest points of the vehicle, and which is the most resistive to the hypothetical 5-10-2G vertical, longitudinal and transverse forces set forth in 10 C.F.R. Section 71.45b(1).

Finally, each lug may also include a plate-like lift lug member attached flush with the outer face of the mounting plate. Preferably, the longitudinal access of the lift lug member is vertically oriented to again minimize any moment forces that the lug applies to the cask walls when the cask is being lifted.

BRIEF DESCRIPTION OF THE SEVERAL FIGURES

DETAILED DESCRIPTION OF THE PREFERRED EMBODIMENT

Figure 1:
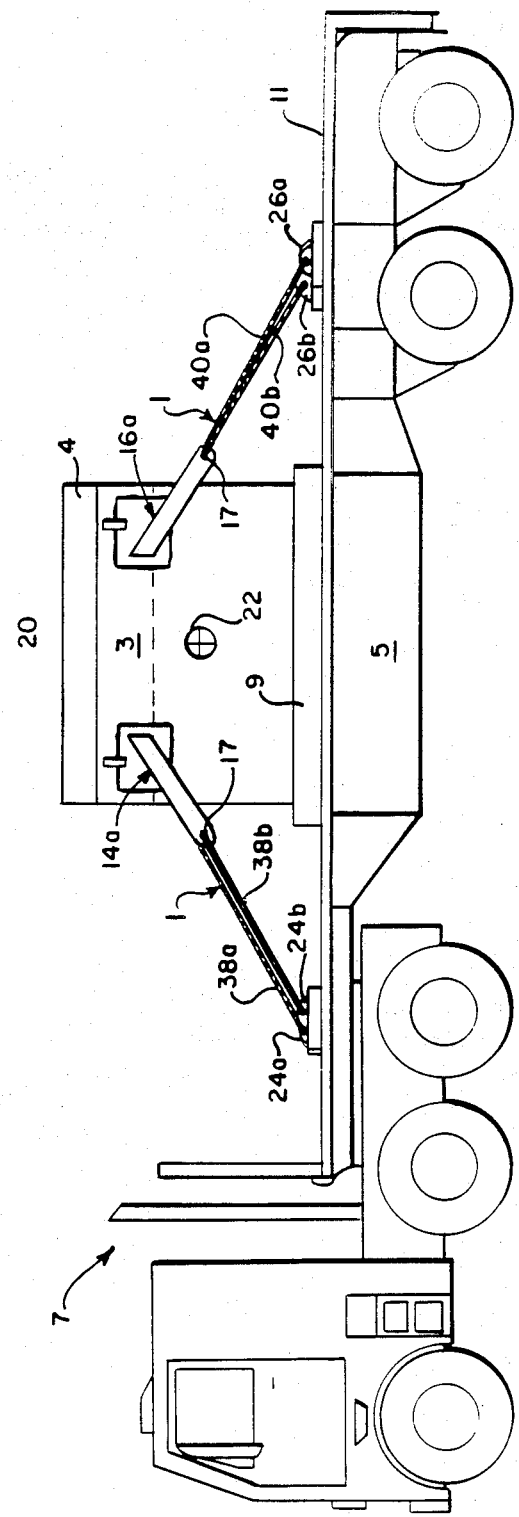
FIG. 1 is a side view of the tie-down assembly of the invention, illustrating how it may be used to secure a transportation cask for hauling radioactive materials onto the trailer of a tractor-trailer.
Figure 2:
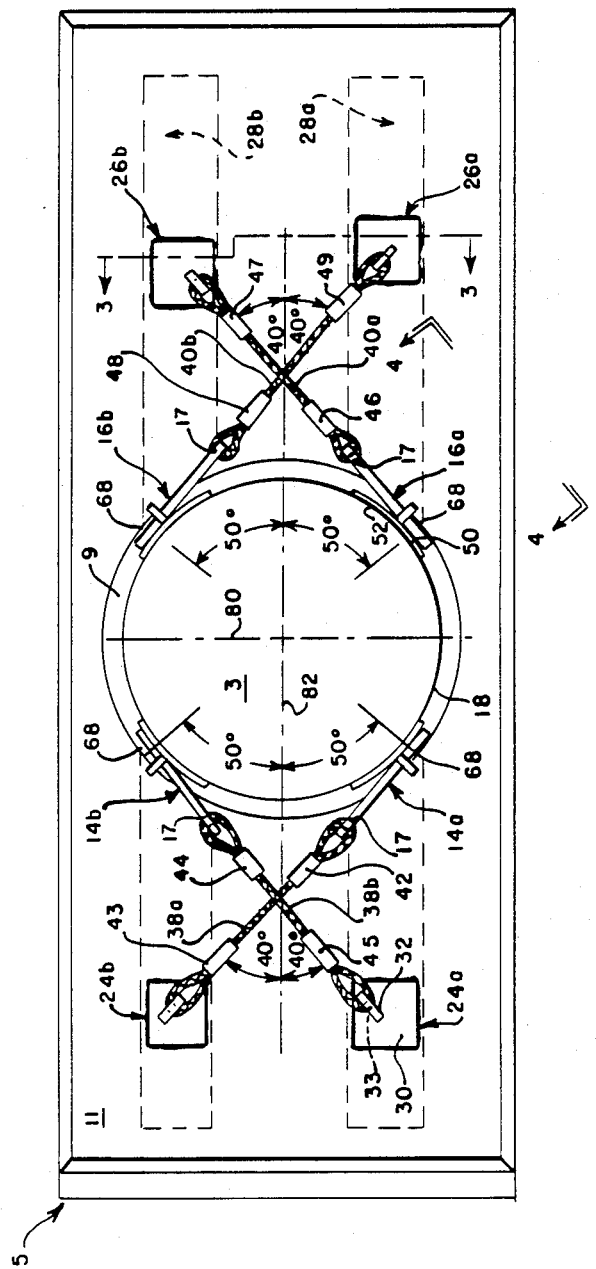
FIG. 2 is a plan view of the tie-down assembly illustrated in FIG. 1 which shows the angular relationships between the front and back pairs of criss-crossing cables of the lug assembly with respect to the longitudinal center line of the cask and trailer.

With reference to FIGS. 1 and 2, wherein like numerals designate like components throughout all the several figures, the tie-down assembly 1 of the invention is particularly adapted for securing a transportation cask 3 that transports radioactive materials onto the trailer 5 of a tractor-trailer 7. The trailer 5 used to carry such cask 3 typically includes a cask retaining ring 9 centrally mounted onto the metal plates that form the upper surface of the trailer deck 11. The interior diameter of such retaining rings 9 is adjustable, via a turnbuckle mechanism (not shown) so as to receive and secure the circular bottom of the cylindrical, upright cask 3. The purpose of such a retaining ring 9 is to help prevent the cask 3 from sliding around on the smooth upper surface of the plate metal deck 11 of the trailer 5 as the tractor-trailer 7 accelerates, brakes, and turns corners. The retaining ring 9 also applies a lateral resisting force which in combination with the lateral force applied by the tie-down assembly 1 provides the moment to prevent the cask 3 from over turning. The lateral resisting force applied by the retaining ring 9 is applied to the lowest point on the cask 3.

The tie-down assembly 1 of the invention functions both to secure the cask 3 to the trailer 5 under extreme acceleration and deacceleration conditions, and to insure that the containment of the cask 3 will not be breached under accident conditions. To these ends, the tie-down assembly 1 includes both front and back pairs of cask lugs 14a, 14b, and 16a, 16b, respectively. Each of these cask lugs terminates in an eyelet bore 17 to allow connection to a tensioned cable. As is evident in FIG. 2, the cask lugs 14a, 14b, and 16a, 16b are welded around the cylindrical circumference of the cask outer wall 18 at the same latitude 20 which is substantially above the center of gravity 22 of the cask 3. In the preferred embodiment, the center of gravity 22 of the cask 3 is approximately equidistant between the latitude 20 of the front and back pairs of cask lugs and the retaining ring 9 in order to minimize the moment forces associated with the cask's natural tendency to tip in response to a strong acceleration or deacceleration force on the trailer 5.

Figure 3:
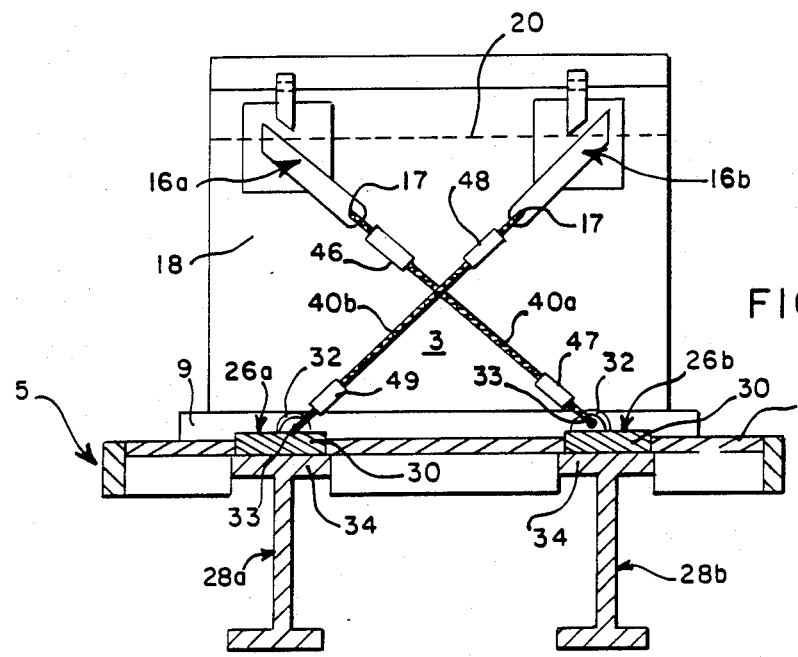
FIG. 3 is a cross-sectional side view of the tie-down assembly illustrated in FIG. 2 along the line 3—3.

The tie-down assembly 1 further includes a front pair of beam lugs 24a, 24b and a back pair of beam lugs 26a, 26b. These two pairs of beam lugs 24a, 24b, and 26a, 26b are welded onto the front and back ends of the support beams 28a, 28b of the trailer 5, respectively. As may be seen in FIG. 2, each of the beam lugs 24a, 24b and 26a, 26b includes a square lug plate 30 having a lug ear 32 integrally formed on its upper surface. The lug ear 32 in turn includes an eyelet bore 33 for receiving the shackle of a tensioned cable. As is best seen in FIG. 3, each of the beam lugs 24a, 24b and 26a, 26b is received within a square recess in the metal plate deck 11 of the trailer 5 and welded over the top flange 34 of each of the support beams 28a, 28b. The attachment of the beam lugs to the front and back ends of the support beams 28a, 28b of the trailer 5 provides the strongest possible anchoring for the cask 3 on the trailer 5, and obviates the need for reinforcing the trailer deck 11.

With reference now to FIGS. 2 and 3, the tie-down assembly 1 of the invention further includes front and back pairs of criss-crossing cables 38a, 38b and 40a, 40b. Each of these cables is joined to the eyelet bores 17, 33, of the particular cask lugs 14a, 14b and 16a, 16b and beam lugs 24a, 24b and 26a, 26b which they interconnect. Each of the criss-crossing pairs of cables 38a, 38b and 40a, 40b includes ratchet binders and shackles 42-49 at both of their ends, respectively, to allow these cables to be detachably joined to the eyelet bores 17 and 33 of their respective cask and beam lugs and then tensioned.

Figure 4:
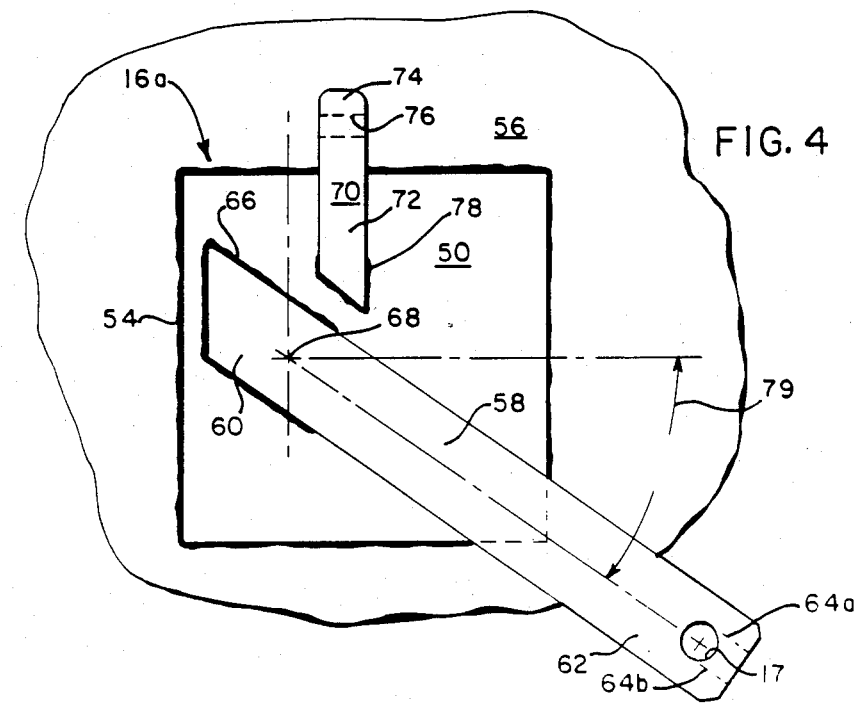
FIG. 4 is an enlarged side view of one of the cask lugs used in the tie-down assembly of the invention.

With respect to FIG. 4, each of the cask lugs 14a, 14b and 16a, 16b includes a substantially flat reinforcing plate 50 whose interior surface 52 is curved in conformity with the cylindrical shape of the outer wall 18 of the cask 3. A weld 54 which covers the entire perimeter of the square reinforcing plate 50 secures this plate onto a portion 56 of the outer cask wall 18. An elongated and substantially flat lug member 58 is connected to the upper face of the reinforcing plate 50. In the preferred embodiment, this elongated lug member 58 includes a tapered, welded end 60 and an eyelet end 62. The eyelet end 62 includes the aforementioned eyelet bore 17. Disposed at the eyelet end 62 along the longitudinal axis of the member 58 is a break-out section indicated by the phantom lines 64a, 64b. A weld 66 tangentially secures the tapered welded end 60 of the lug member 58 to outside of the reinforcing plate 50 at point 68. The taper included in the welded end 60 increases the length and hence the strength of the weld 66. In the event of an accident wherein a cable 38a, 38b, 40a, 40b applies extreme tensile forces along the longitudinal axis of the lug member 58, the member 58 may be expected to break at its end 62 along the section indicated by the phantom lines 64a, 64b since the shear strength of this section is less than the tensile strength of the lug member 58 as a whole. However, in the event of an accident which applies extreme shear forces to the lug member 58 as a whole, the entire lug member 58 may be expected to tear or snap off of the reinforcing plate 50 attached to the outer cask wall 18 due to the lower ductility of the steel forming the cask lugs 14a, 14b and 16a, 16b, as is discussed in greater detail hereinafter.

Each of the cask lugs 14a, 14b and 16a, 16b further includes a lift lug member 70. Like the previously described lug member 58, the lift lug member 70 also includes a tapered welded end 72, and an eyelet end 74. The eyelet end 74 has an eyelet bore 76, while the welded end 72 includes a weld 78 around each of its three sides as shown. Again, the tapered shape of the welded end 72 increases the length and hence the strength of the weld 78. Moreover, the vertical orientation of the lift lug member 70 minimizes moment forces between the mounting plate 50 and any lifting cable secured through the eyelet end 62.

Each of the cask lugs 14a, 14b and 16a, 16b is preferably formed from a metal which is less ductile than the metal used to form the outer wall 18 of the cask 3, but yet which has a greater tensile strength than the metal forming this wall 18. The applicants have found that fulfillment of the first criteria insures that, in a case where an extreme tensile force is applied to one of the cask lugs 14a, 14b or 16a, 16b, the lug will snap, tear or pull off of the reinforcing plate 50 attached to the outer cask wall 18 without damaging the wall 18. The applicants have found that compliance with the second criteria allows the overall thickness of the cask lugs 14a, 14b and 16a, 16b to be minimized, thus minimizing the shear and bending forces that the lug will apply to its respective portion 56 of the outer cask wall 18 during ordinary operation or during an accident. In the preferred embodiment, each of the cask lugs is formed from ASTM A572 Grade 65 steel. Such steel has an average tensile yield of 65,000 psi, and an average ultimate tensile strength of 80,000 psi, giving it what applicants term a "ductility quotient" of 1.23 which is computed by dividing the average ultimate tensile strength by the average tensile yield. By contrast, the cask outer walls 18 are preferably formed from ASTM A516 Grade 55 steel. Such steel has an average tensile yield of 35,000 psi and an average ultimate tensile Yield of about 65,000 psi. Accordingly, the ductility quotient of the steel forming the cask outer walls 18 is 2.166, which is approximately 43 percent greater than the ductility quotient of 1.23 associated with the steel forming the cask lugs. The substantial difference in the ductility quotients between the material forming the outer cask wall 18 and the material forming the cask lugs 14a, 14b and 16a, 16b insures that these lugs will cleanly tear, snap off or pull out of the cask 3 when subjected to an extreme impulsive force. To insure that the advantages associated with the relative brittleness of the material forming the cask lugs relative to the material forming the cask outer wall 18 will not be cancelled out or significantly compromised by the superior ultimate tensile strength of the steel forming the cask lugs, the cask lugs are fabricated with appropriately thin cross-sections both in general and at the breakoff section indicated between phantom lines 64a, 64b. These thin cross-sections cause the cask lugs 14a, 14b and 16a, 16b to break long before the forces they transmit to the cask wall 18 become intense enough to break or rupture the wall 18. The reinforcing plate 50 of each cask lug further serves to insulate its respective portion 56 of the outer cask wall 18 from such excessive forces by uniformly distributing any extreme moment forces transmitted by its lug member 58 over the relatively larger area of the plate 50 itself.

FIGS. 2 and 4 best illustrate the preferred angles of orientation of both the front and back crisscrossing pairs of cables 38a, 38b and 40a, 40b, and the preferred angles of inclination of the lug members 58. As is best seen with respect to FIG. 2 the tangent points 68 where the welded ends 60 of the lug members 58 are secured onto the reinforcing plates 50 of the cask lugs are not uniformly spaced around the circumference of the cask 3 at 45 degree angles with respect to the transverse center line 80 and longitudinal center line 82 of the cask 3. Instead, these tangent points 68 are located at 50 degree angles with respect to the longitudinal center line 82 of the cask 3. Moreover, instead of transversing one another at a 90 degree angle as was the case in prior art configurations, both the front and back pairs of criss-crossing cables 38a, 38b and 40a, 40b cross one another at an angular distance of 80 degrees with respect to the longitudinal center line 82 of the cask 3 as viewed from the plan perspective (as is shown by the two, contiguous 40 degree angles). Such relatively non-uniform spacing of the tangent points 68 of the cask lugs around the cask circumference in combination with the non-right angular transversal of the front and back pairs of criss-crossing cables 38a, 38b and 40a, 40b results in a tie-down assembly 1 that is better able to resist forces parallel with the longitudinal center line 82 of the cask 3. This is advantageous for two reasons. First, in the event of an accident, the greatest forces applied to the cask 3 are likely to be oriented parallel to the longitudinal center line of the cask 3. Second, such a configuration is better able to satisfy the 2-5-10-G criteria set forth in the previously mentioned government regulations.

In closing, it should be noted that the lug members 58 of each of the front and back pairs of cask lugs 14a, 14b and 16a, 16b are canted at a slightly different angle with respect to the horizontal (35 degree vs. 38 degree) so that the pairs of criss-crossing tensioned cables 38a, 38b do not touch in the region where they cross over.

We claim:

1. An improved tie-down assembly for securing a cask to a vehicle having support beams, comprising:
   a plurality of cask lugs, each of which of attached to a portion of the outer wall of the cask for connecting the cask to tensioned cables which in turn are attached to the vehicle, wherein said cask lugs are formed from a material whose ratio of ultimate stress to yield stress is at least about 6 percent lower than the ratio of ultimate stress to yield stress of the material forming said portions of the outer wall of the cask so that said cask lugs will break off or pull out of the cask before they apply a force great enough to break or rupture said outer wall portions of said cask.

2. An improved tie-down assembly as defined in claim 1, wherein the profile of the cask lugs is substantially flat, and wherein the ultimate stress of the material forming the cask lugs is greater than the ultimate stress of the material forming the portions of the outer cask walls to which they are attached in order to minimize the flat profile of the cask lugs.

3. An improved tie-down assembly as defined in claim 2, further including a plurality of beam lugs connected to said support beams of said vehicle for providing anchoring points for the tensioned cables connected to the cask lugs.

4. An improved tie-down assembly as defined in claim 1, wherein the ratio of the ultimate stress to the yield stress of the material forming the cask lugs is at least about 10 percent less than the ratio of the ultimate stress to the yield stress of the material forming the cask wall portions.

5. An improved tie-down assembly as defined in claim 1, wherein the ratio of the ultimate stress to the yield stress of the material forming the cask lugs is at least about 30 percent less than the ratio of the ultimate stress to the yield stress of the material forming the cask wall portions.

6. An improved tie-down assembly as defined in claim 1, wherein the cask lugs are formed from a metal having a ultimate stress of between about 70,000 to 90,000 psi, and a yield stress of between about 60,000 to 70,000 psi, and wherein the cask wall portions are formed from a metal having an ultimate stress of between about 60,000 to 70,000 psi, and a tensile yield stress of between about 20,000 to 40,000 psi.

7. An improved tie-down assembly as defined in claim 1, wherein the cask lugs are formed from ASTM A572 grade 65 steel, and the cask wall portions are formed from ASTM A516 grade 55 steel.

8. An improved tie-down assembly as defined in claim 3, wherein said vehicle is elongated, and said cask is cylindrical in shape, and oriented upright on said vehicle.

9. An improved tie-down assembly as defined in claim 8, wherein there are four cask lugs connected around the circumference of the cask at 50 degree angles with respect to a center line of the cask that is parallel with the longitudinal axis of the vehicle.

10. An improved tie-down assembly as defined in claim 9, wherein each of the cask lugs includes a reinforcing plate of substantially the same shape as the contour of the portions of the outer cask wall to which it is attached so as to be attachable flush thereto, and an elongated, plate-like lug member having a face connected substantially flush with the reinforcing plate to further minimize the flat profile of the cask lugs.

11. An improved tie-down assembly as defined in claim 10, wherein the longitudinal axis of the lug member of each of the cask lugs is colinear with the longitudinal axis of the respective tensioned cable so that the moment forces applied to the cask wall portions by the tensioned cables are minimized.

12. An improved tie-down assembly as defined in claim 11, including two pairs of tensioned cables located on opposing ends of said elongated vehicle, each of which is generally arranged in a criss-cross configuration as viewed in plan for connected opposing sides of said cask to opposing support beams and wherein each of the tensioned cables traverses the longitudinal axis of the vehicle at an angle of about 40 degrees from the plan perspective.

13. An improved tie-down assembly as defined in claim 12, wherein the lug members of each pair of cask lugs are aligned at different angles with respect to the horizontal so that the tensioned cables of each pair do not come into contact with one another in the region where they cross.

14. An improved tie-down assembly for securing a cask to an elongated trailer having a front end and a back end and a pair of parallel support beams connected along its longitudinal axis, comprising:
   a. a plurality of substantially flat cask lugs, each of which is attached to a portion of the outer wall of the cask, wherein said cask lugs are formed from a material whose ratio of ultimate stress to yield stress is at least 6 percent lower than the ratio of ultimate stress to yield stress of the material forming the outer wall portions of the cask so that said cask lugs will break off or pull out of the cask before they apply a force great enough to break or rupture said outer wall portions of the cask;
   b. a plurality of beam lugs connected near the front and back of said support beams, and
   c. tensioned cables interconnecting each of said cask lugs with one of said beam lugs.

15. An improved tie-down assembly as defined in claim 14, wherein said cask lugs are substantially flat, and wherein the ultimate stress of the material forming the cask lugs is greater than the ultimate stress of the material forming the outer wall portions to minimize the flat portion of the cask lugs and the moment forces they apply to their respective outer wall portion.

16. An improved tie-down assembly as defined in claim 14, wherein the cask lugs are formed from a metal having a ultimate stress of between about 70,000 to 90,000 psi, and a yield stress of between about 60,000 to 70,000 psi, and wherein the cask wall portions are formed from a metal having an ultimate stress of between about 60,000 to 70,000 psi, and a tensile force stress of between about 20,000 to 40,000 psi.

17. An improved tie-down assembly as defined in claim 14, wherein the cask lugs are formed from ASTM A572 grade 65 steel, and the cask wall portions are formed from ASTM A516 grade 55 steel.

18. An improved tie-down assembly as defined in claim 14, including front and back pairs of cask lugs, the cask lugs of each cask lug pair being disposed on substantially opposite sides of the longitudinal center line of said cask, and front and back pairs of beam lugs, the beam lugs of each beam lug pair being disposed on substantially opposite sides of the longitudinal center line of said cask.

19. An improved tie-down assembly as defined in claim 18, including two pairs of criss-crossing tensioned cables located on the front and back ends of said trailer for connecting said front and back pairs of cask lugs to said front and back pairs of beam lugs, wherein each of said tensioned cables traverses the longitudinal axis of the trailer at an angle of about 40 degrees from the plan perspective.

20. An improved tie-down assembly as defined in claim 14, wherein each of the cask lugs includes an elongated lug member that is oriented colinearly with the longitudinal axis of its respective tensioned cable so that the moment forces applied to the cask wall portions by the tensioned cables are minimized.

21. An improved tie-down assembly as defined in claim 14, wherein each of the cask lugs includes a reinforcing plate of substantially the same shape as the contour of the outer wall of the cask so as to be attachable flush thereto, and an elongated, substantially flat lug member connected substantially flush with the reinforcing plate, whereby the moment forces applied to the outer cask wall by the cask lugs are minimized.

22. An improved tie-down assembly as defined in claim 14, wherein each of the cask lugs includes an elongated and substantially plate-like lift lug member which is vertically oriented to minimize moment forces.

23. An improved tie-down assembly for securing an upright, cylindrical cask to an elongated trailer having a front end and back end and a pair of parallel support beams symmetrically disposed along the longitudinal center line of the trailer, comprising:
   a. front and back pairs of cask lugs disposed on the sides of the cask facing the front and back ends of the trailer, respectively, wherein said cask lugs are formed from a material whose ratio of ultimate stress to yield stress is at least about 6 percent lower than the ratio of ultimate stress to yield stress of the material forming the outer wall portions of the cask;
   b. a plurality of beam lugs connected near the front and back ends of said support beams, and
   c. front and back pairs of criss-crossing tensioned cables interconnecting the front and back pairs of the cask lugs to the beam lugs connected near the front and back ends of the support beams, respectively, wherein each of the tensioned cables is oriented approximately 40 degrees with respect to the longitudinal center line of the trailer from a plan perspective to more effectively resist forces oriented along the longitudinal center line of the trailer.

24. An improved tie-down assembly as defined in claim 23, wherein the profile of the cask lugs is substantially flat, and wherein the ultimate stress of the material forming the cask lugs is greater than the ultimate stress of the material forming the portions of the outer cask walls to which they are attached in order to minimize the flat profile of the cask lugs.

25. An improved tie-down assembly as defined in claim 23, wherein each of said cask lugs includes an elongated lug member having one end connected to its respective cask wall portion and another end connected to its respective tensioned cable, and wherein the longitudinal axis of each lug member of each cask lug is oriented colinearly, with the longitudinal axis of its respective tensioned cable to minimize the moment forces applied to the cask wall portions by the tensioned cables through the cask lugs.

26. An improved tie-down assembly as defined in claim 23, wherein the ratio of the ultimate stress to the yield stress of the material forming the cask lugs is at least about 10 percent less than the ratio of the ultimate stress to the yield stress of the material forming the cask wall portions.

27. An improved tie-down assembly as defined in claim 23, wherein the ratio of the ultimate stress to the yield stress of the material forming the cask lugs is at least about 30 percent less than the ratio of the ultimate stress to the yield stress of the material forming the cask wall portions.

28. An improved tie-down assembly as defined in claim 23, wherein the ratio of the ultimate stress to the yield stress of the material forming the cask lugs is at least about 42 percent less than the ratio of the ultimate stress to the yield stress of the material forming the cask wall portions.

29. An improved tie-down assembly as defined in claim 23, wherein the cask lugs are formed from a metal having an ultimate stress of between about 70,000 to 90,000 psi, and a yield stress of between about 60,000 to 70,000 psi, and wherein the cask wall portions are formed from a metal having an ultimate stress of between about 60,000 to 70,000 psi, and a yield stress of between about 20,000 to 40,000 psi.

30. An improved tie-down assembly as defined in claim 23, wherein the cask lugs are formed from ASTM A572 grade 65 steel, and the cask wall portions are formed from ASTM A516 grade 55 steel.

31. An improved tie-down assembly as defined in claim 25, wherein the trailer has a horizontal support surface, and wherein the lug member in each pair of cask lugs are oriented at a different angle with respect to the support surface so that the tensioned cables connected thereto do not come into contact at the region where they cross over one another.

* * * * *